Nov. 10, 1959 S. PAULL 2,912,681
COUNTER CIRCUIT
Filed May 8, 1957
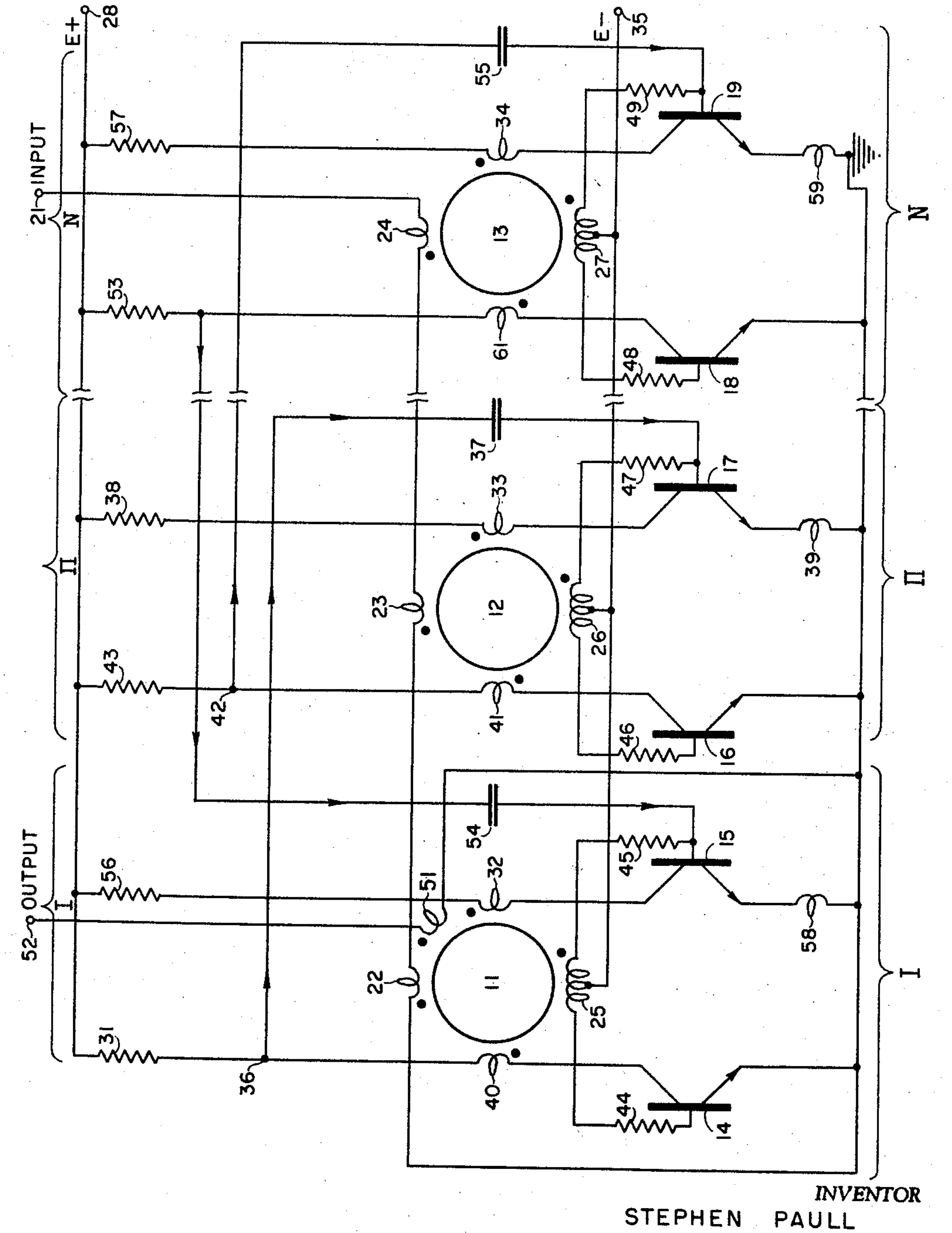
INVENTOR
STEPHEN PAULL
BY W R Maltby
Richard C Reed
ATTORNEYS

United States Patent Office 2,912,681

Patented Nov. 10, 1959

2,912,681

COUNTER CIRCUIT

Stephen Paull, Falls Church, Va.

Application May 8, 1957, Serial No. 657,986

3 Claims. (Cl. 340—174)

(Granted under Title 35, U.S. Code (1952), sec. 266)

The invention described herein may be manufactured and used by or for the Government of the United States of America for governmental purposes without the payment of any royalties thereon or therefor.

This invention relates to electrical signal counter circuits and more particularly to a scale of N, where N is any integer greater than one, counter circuit, in which magnetic cores and transistors are used, to provide an output signal at a sub-harmonic of an input signal.

Prior counter circuits have been successfully employed in many devices but such circuits are not completely satisfactory in all devices. In the prior counter circuits, carrier currents or "clocks" were combined with the input electrical signal to be counted to trigger and operate the counter circuit, and the mode of application of pulses to be counted was required to be synchronized with the carrier current or "clock" and asynchronous operation thereof in a plurality of modes was impossible. A power supply was required to deliver power continuously, and any stored information acquired during the counting operation was destroyed in the event of power supply failure.

It is an object of this invention to provide a magnetic core counter circuit in which the input pulse to be counted triggers the operation of the circuit, and a power supply reverses the flux alignment of the magnetic core.

Another object is to provide a counter circuit in which the need for a carrier current or "clock" is eliminated.

A further object is to provide a counter circuit with a power supply which is used intermittently and then, only during reversal of flux alignment.

Still another object is to provide a counter circuit in which any stored information is retained in the event of power supply failure.

The figure shows a schematic diagram of the circuit of this invention.

A final object is to provide a counter circuit which operates either synchronously or asynchronously in a plurality of modes.

By convention, the stabilized flux alignment in a magnetic core which results from positively polarized saturating magnetizing force is designated as condition or state "1" and the stabilized flux alignment which results from negatively polarized saturating magnetizing force is designated as condition or state "0." The flux density remaining after the removal of a saturating magnetizing force is known as "remanence."

In this invention N magnetic switching circuitry cores in N counting stages are provided of which one core is in the state of magnetic remanence "0" and all of the remaining cores are in the state designated as "1." A positive input current pulse simultaneously fed in series through trigger windings on each core will act to change the state of the lone "0" in the first stage to a "1." A circuit is provided whereby such change of state is followed in the second stage by a change of state of its core from "1" to "0." A second input pulse produces effects, which are identical with the effects of the first input pulse, to the second and third stages. If the condition of the first stage core is initially unique, that is, the lone "0," then N input pulses will produce a single output pulse from the said first stage so that a counter of the order of N input pulses to one output pulse is provided.

Each of the N stages of the counter circuit of this invention is identical in structure and operation except for the addition of the output circuit in stage I. It is noted that each stage has: a magnetic core, such as 11 in stage I, with a winding 22 through which the input signal to be counted is pulsed; a transistor switch control winding 25 which provides positive potential through current limiting resistor 44 or 45 to maintain transistor switch 14 or 15 closed during switching of the magnetic core from "0" to "1" or "1" to "0," respectively. The n-p-n transistor switch 14 when closed becomes a part of the flux alignment switching circuit which also includes power supply 28, resistor 31, switching winding 40 connected by transistor switch 14 to ground. Resistor 47, winding 26, bias 35, ground, and capacitor 37 make up a differentiating circuit which utilizes the decay of current in the switching circuit of stage I to provide a trigger pulse to the reset circuit of stage II as discussed hereinafter. The reset circuit of stage I is triggered by a positive pulse from the differentiating circuit which is made up of resistor 53 in stage N and capacitor 54 in stage I. Such positive pulse applied to the base of n-p-n transistor switch 15 closes said switch to provide a current flow through current limiting resistor 56, reset winding 32 to switch the flux alignment of core 11 from "1" to "0," switch 15 and choke 58, which suppresses oscillations, to ground. Output winding 51 provides a positive pulse at output 52 during the resetting of core 11 from "1" to "0." All transistors are normally in cut-off condition. In case transistors with zero cut-off bias are used, bias 35 is connected to ground.

These and other features of the invention, as well as additional objects therefor, will become more apparent by reference to the ensuing description and the accompanying drawings in which a schematic diagram of the magnetic core counting circuit of a preferred embodiment of this invention appears.

Referring now to the drawing, there is shown in the single figure, a plurality of counting stages I, II and N where I is the first of N stages, II is the second, and N is the last. The cores 11, 12 and 13 are binary magnetic cores capable of maintaining either of two states without any external power supply. The cores are of materials having rectangular hysteresis loops (commonly called "square-loop" materials) such as thin iron-nickel-molybdenum alloy tape wound or ferrite materials.

By convention, the polarity of voltage across a core winding at the dot end is negative during flux reversal of the core from negative to positive flux alignment as from a "0" to a "1." Also, the not-dotted end of a core winding is positive during such change. It follows that a positive current pulse fed into the not-dotted end of a core winding produces magnetizing force which changes the core from "0" to "1."

Such a positive pulse is the pulse to be counted which is applied at input 21 through input windings 22, 23 and 24 and which effects no change upon the condition "1" cores 12 and 13. Core 11, however, is caused to start to change from the remanence state "0" toward the remanence state "1." A positive potential is induced at all not-dotted windings of core 11 including transistor switch control winding 25. Transistor switch 14, an n-p-n type, is closed by the application of such positive potential to the base thereof, whereby a direct current flows from positive power supply (E+) 28 through coupling resistor 31, switching winding 40 and transistor switch 14 to ground, and core 11 is switched from "0" to "1." Capacitor 37 in stage II is provided to pass only alternating current pulses to the base of transistor switch 17. The polarity of the windings of core 11 are such that during switching from "0" to "1," winding 25 alone produces an effective positive potential. The positive output of winding 25 maintains transistor switch 14 closed until saturation of the core 11. Resistor 44 is a current limiting resistor as are resistors 45, 46, 47, 48 and 49. Upon saturation of core 11, induced voltage across winding 25 vanishes and transistor switch 14 is, therefore, opened and is maintained open by the negative potential from bias source 35. The opening of transistor switch 14 is accompanied by a disappearance of current flow through coupling resistor 31. Thus, the potential drop across resistor 31 disappears and the potential rises at point 36 to be the same as the positive power supply 28. The rise of potential at point 36 provides a positive pulse to be applied through capacitor 37 to the base of transistor switch 17. Transistor switch 17 is now closed and current flows through resistor 38, reset winding 33, transistor switch 17 and choke 39. Current through winding 33 produces a magnetizing force which is polarized to change the magnetic core 12 from "1" to "0," that is, a positive potential is applied at the dotted end of the winding 33 to change the core from positive remanence "1" to negative remanence "0." The potential induced on all the other windings of core 12 is positive at the dotted end of such windings. The dotted end of transistor switch control winding 26 is the only dotted end of a winding that is connected to a control element. Therefore, transistor switch 17 is maintained in closed condition by the positive potential supplied by core winding 26 until the saturation of core 12 in "0" condition. Upon saturation of core 12, voltage across control winding 26 vanishes and transistor switch 17 is opened and is maintained open by bias voltage from negative potential source 35. Since transistor switch 16 has remained open during the entire operation of the device triggered by the first input pulse, there has been no current flow to change the potential at point 42 and, therefore, no pulse is produced to trigger any further operation of the counter circuit.

Core 12 is now the only core in condition "0," all others are in condition "1." The cores remain in this configuration until the arrival of another pulse to be counted.

The second positive pulse to be counted at input 21 effects the change of the only "0" condition core 12 in stage II to "1" and then the condition of the core of the next succeeding stage is changed from "1" to "0" in exactly the same manner as the operation effected by the first input pulse discussed above.

An N minus 1 pulse to be counted at input 21 effects the change of the condition of core of stage N minus 1 from "0" to "1" and core 13 of stage N from "1" to "0" in exactly the same manner as the first pulse to be counted influences the operation of stages I and II.

An Nth pulse effects the change of the condition of core 13 of stage N from "0" to "1" and the change of the condition of core 11 of stage I from "1" to "0," thereby returning the remanence of all of the cores to the original configuration. That is, the core of stage I is in condition "0" and the cores of all the other stages are in condition "1." An output pulse is produced by output winding 51, and is polarized to be positive at point 52 during the change of the remanence of core 11 from "1" to "0." Since N input pulses to be counted produce one positive output pulse, the circuit is a scale of N counter.

It is noted that the differentiating circuits (one of which includes resistor 47 and capacitor 37, another includes resistor 49 and capacitor 55, and another includes resistor 45 and capacitor 54) provide positive pulses to close reset transistor switches 17 and 19 and 15, respectively. Resistors 56, 38 and 57 are circuit balancing resistors and coils 58, 39 and 59 are chokes to suppress oscillations. Winding 61 is the switching winding for core N.

Input pulses to be counted are not required to furnish the energy for core flux reversal, but act merely as triggers for such action. Flux reversal energy is supplied by the positive power supply 28. In the event of power supply failure the remanence state of all cores is unaffected and the counting operation may be resumed when power is restored without loss of count.

Energy drawn from the power supply occurs only during flux reversals and results in energy conservation between counts.

The counter circuit of this invention can be operated by succeeding input trigger pulses which can be supplied at any interval greater than a minimum time lapse required for the operation of the two stages which are operated upon the receipt of a first input pulse.

Hence maximum counting rates are limited by switching speeds of core materials and transistors. The minimum time lapse is determined by the magnitude of the power supply, circuit resistance and core parameters. Freedom from the limitations of synchronous operation imposed by the carrier current or "clock" of other counter circuits is provided in this circuit because the circuit operation is triggered by the input signal only and does not require a "clock" signal nor carrier. Circuit operation of the device of this invention is automatic and the energy for flux reversal is supplied by a power supply. A second pulse to be counted can be applied at any time after the completion of operation of the said two stages. The time lapse between pulses to be counted can indeed be very short to afford comparatively high frequency counting. The interval between the completion of the operation of the two stages triggered by a pulse to be counted and the application of the next pulse to be counted can vary from pulse to pulse to be any interval whatsoever provided the interval is greater than the above discussed minimum. Where, in prior counter circuits the pulses to be counted were synchronized with the carrier current or "clocks," the counter circuit of this invention can operate asynchronously in a variety of arbitrary modes because of the absence of any carrier current or "clocks." The range of usefulness of the counter circuit of my invention is greatly extended over the range of usefulness of prior counter circuits.

It is obvious that the polarity of all of the elements of this circuit can be reversed and that the choice of polarity specifically discussed is for illustrative purpose only.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. In a counter circuit, a power source, a common return, an input terminal, a plurality of identical counter stages, each of said stages including a high remanence magnetic core, an input winding on each of said cores, a remanence changing winding on each of said cores, a center tapped control winding on each of said cores and a reset winding on each of said cores, said input windings being serially connected between said input terminal and said common return, a first connecting point in each stage connected to said power source and to one end of said remanence changing winding, first and second transistors in each stage each including a base, a collector and an emitter, the base of said first transistor connected to one end of said center tapped control winding, said reset winding connected between said power source and the collector of said second transistor, a second connecting point in each stage, a resistor in each stage connected between the other end of said center tapped control winding and said second connecting point, the base of said second transistor connected to said second connecting point, the emitters of both of said transistors connected to said common return, bias means connected to the center tap of said control winding, each of said stages coupled across a capacitor between said connecting point in one stage and the second connecting point in the following stage.

2. In a counter circuit, a power source, a common return, an input terminal, a plurality of identical counter stages, each of said stages including a high remanence magnetic core, an input winding on each of said cores, a remanence changing winding on each of said cores, a center tapped control winding on each of said cores and a reset winding on each of said cores, said input windings being serially connected between said input terminal and said common return, a first connecting point, a first resistor connected between said power source and said connecting point, a first and a second transistor, each transistor having a collector, an emitter and a base, said remanence changing winding connected between said first connecting point and the collector of said first transistor, the emitters of said transistors connected to said common return, a second resistor connected between the base of said first transistor and one end of said center tapped control winding, a third resistor connected between said power source and one end of said reset winding, the other end of said reset winding connected to the collector of said second transistor, a second connecting point, a fourth resistor connected between the other end of said center tapped control winding and the said second connecting point, bias means connected to said center tap of said control winding, each of said stages coupled across a capacitor between the first connecting point in one stage and the second connecting point in the following stage.

3. In a counter circuit, a power source, a common return, an input terminal, a plurality of identical counter stages, each of said stages including a high remanence magnetic core, an input winding on each of said cores, a remanence changing winding on each of said cores, a center tapped control winding on each of said cores and a reset winding on each of said cores, said input windings being serially connected between said input terminal and said common return, a first connecting point, a first resistor connected between said power source and said connecting point, a first and a second transistor, each transistor having a collector, an emitter and a base, said remanence changing winding connected between said first connecting point and the collector of said first transistor, the emitter of said first transistor connected to said common return, a second resistor connected between the base of said first transistor and one end of said center tapped control winding, a third resistor connected between said power source and one end of said reset winding, the other end of said reset winding connected to the collector of said second transistor, choke means connected between the emitter of said second transistor and said common return, a second connecting point, a fourth resistor connected between the other end of said center tapped control winding and the second connecting point, the base of said second transistor connected to said second connecting point, bias means connected to said center tap of said control winding, each of said stages coupled across a capacitor between the first connecting point in one stage and the second connecting point in the following stage.

References Cited in the file of this patent

UNITED STATES PATENTS

| | | |
|---|---|---|
| 2,591,406 | Carter et al. | Apr. 1, 1952 |
| 2,747,110 | Jones | May 22, 1956 |
| 2,772,370 | Bruce et al. | Nov. 27, 1956 |